United States Patent
Yang et al.

(10) Patent No.: US 10,530,645 B2
(45) Date of Patent: Jan. 7, 2020

(54) SYSTEMS AND METHODS FOR LOCALIZED AND VIRTUALIZED RADIO ACCESS NETWORKS

(71) Applicant: Verizon Patent and Licensing Inc., Arlington, VA (US)

(72) Inventors: Jin Yang, Orinda, CA (US); Yee Sin Chan, San Jose, CA (US); Shankar Venkatraman, San Jose, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/996,471

(22) Filed: Jun. 2, 2018

(65) Prior Publication Data
US 2019/0372837 A1    Dec. 5, 2019

(51) Int. Cl.
| | | |
|---|---|---|
| H04L 12/24 | (2006.01) | |
| H04L 29/08 | (2006.01) | |
| H04L 12/911 | (2013.01) | |

(52) U.S. Cl.
CPC ...... *H04L 41/0806* (2013.01); *H04L 41/5009* (2013.01); *H04L 47/70* (2013.01); *H04L 67/2842* (2013.01)

(58) Field of Classification Search
CPC . H04L 2012/5608; H04L 47/24; H04L 47/70; H04L 2012/5679; H04L 2012/5632; H04L 47/50; H04L 47/6295; H04W 84/12; H04W 88/08; H04W 80/04; H04W 88/06; H04W 84/18; H04W 74/08; H04W 36/30; H04W 36/24; H04W 84/08; H04W 76/02; H04W 72/04; H04W 8/26
USPC .... 370/310.2, 328, 338, 329, 332, 341, 349, 370/395.21, 395.43
See application file for complete search history.

(56) References Cited

U.S. PATENT DOCUMENTS

| | | | |
|---|---|---|---|
| 6,374,112 B1 * | 4/2002 | Widegren | H04W 28/18 455/452.2 |
| 2012/0033554 A1 * | 2/2012 | Shiva | H04W 28/0205 370/235 |
| 2014/0092736 A1 * | 4/2014 | Baillargeon | H04W 72/1226 370/230 |

OTHER PUBLICATIONS

5G Americas, "5G Network Transformation," Dec. 2018.
(Continued)

*Primary Examiner* — Brenda H Pham

(57) ABSTRACT

A wireless network provides differentiated service via a first management device that manages and provisions resources that are located in an edge cloud of the wireless network separate from a second management device that manages and provisions resources that are located in a core cloud of the wireless network. The first management device may provision the edge cloud resources to provide various functionalities and services of the wireless network in a localized manner to user equipment ("UEs") that are associated with low latency or high reliability requirements. The second management device may provision the core cloud resources to provide the same or different functionalities and services of the wireless network in a centralized manner to UEs that are not associated with low latency and high reliability requirements.

20 Claims, 9 Drawing Sheets

(56) References Cited

OTHER PUBLICATIONS 2 5G PPP Architecture Working Group, "View on 5G Architecture," Jul. 2016 (available at https://5g-ppp.eu/white-papers/).
Sassan Ahmadi, "xRAN and C-RAN Integration in M-CORD," Open Networking Foundation, Nov. 2017.

* cited by examiner

US 10,530,645 B2

SYSTEMS AND METHODS FOR LOCALIZED AND VIRTUALIZED RADIO ACCESS NETWORKS

BACKGROUND

The voice and/or data services of wireless networks may be used by a variety of applications and devices. Autonomous vehicles, robotics, augmented or virtual reality systems, or industrial machinery may be examples of devices other than traditional telecommunications devices (e.g., smartphones) that access the voice and/or data services of wireless networks for applications (e.g., autonomous driving, robotic coordination, cloud computing, etc.) other than voice calling, Internet browsing, or media streaming. These different applications and devices may have different requirements with respect to bandwidth, latency, reliability, and other parameters associated with different services that may be accessed via a wireless network.

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide distributed resource management for localizing and/or centralizing different functionalities and services that are provided by a wireless network. The distributed resource management may be used to provide differentiated services in the wireless network in order to satisfy different access/service requirements associated with different user equipment ("UEs") or different services requested by the UEs.

The distributed resource management may include managing and provisioning resources that are located in a core cloud of the wireless network, separate from managing and provisioning resources that are located in one or more edge clouds of the wireless network. As discussed herein, the wireless network may include multiple edge clouds, which may each be collocated with, located in vicinity of, or geographically proximate to a Radio Access Network ("RAN") of the wireless network. In contrast, the core cloud may be centralized, and may be communicatively coupled with multiple RANs (e.g., via the edge clouds).

Figure 1:
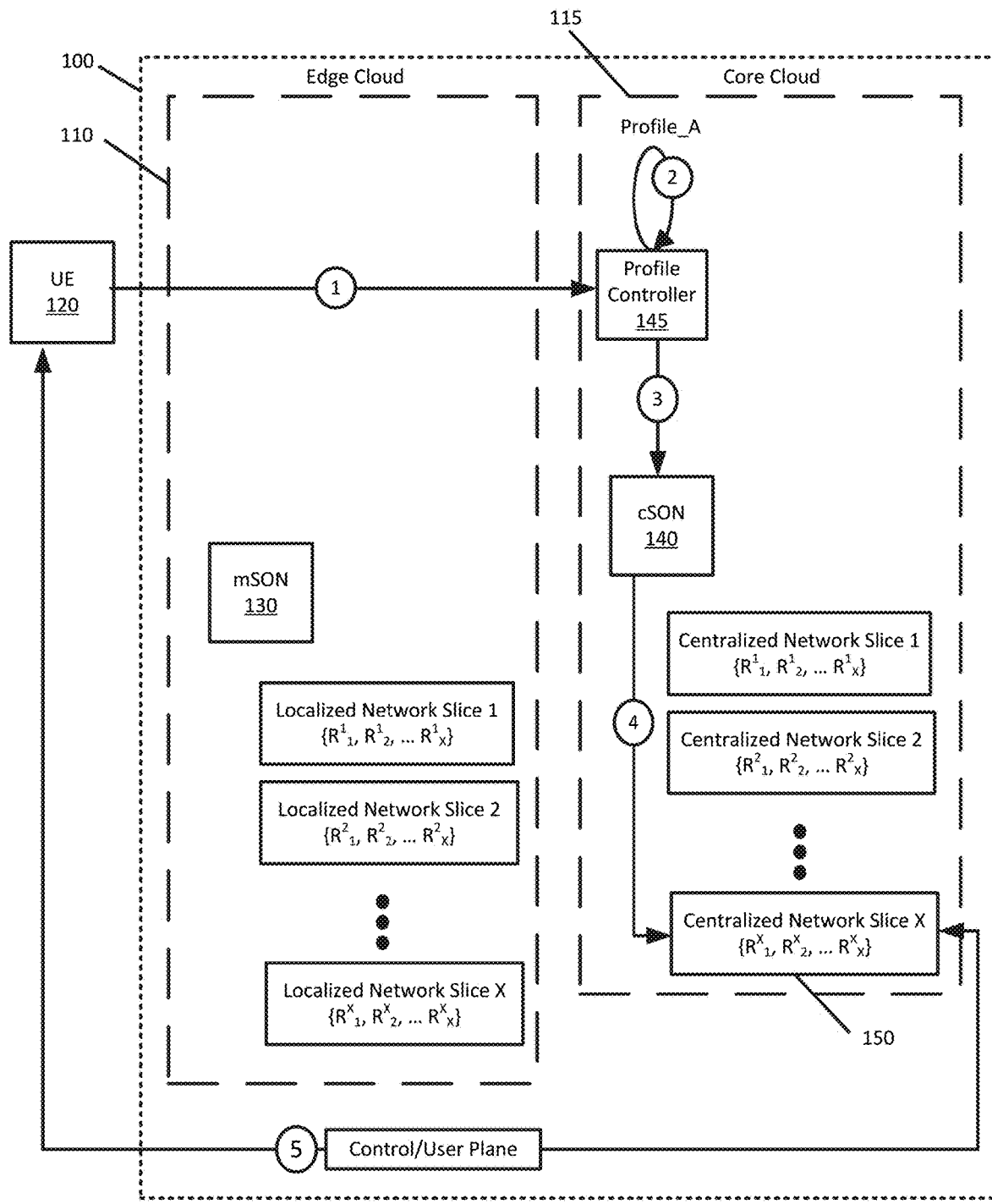
FIG. 1 illustrates an example of a centralized Self Organizing Network ("cSON") management device, operating in a core cloud of a wireless network, according to an implementation described herein.
Figure 2:
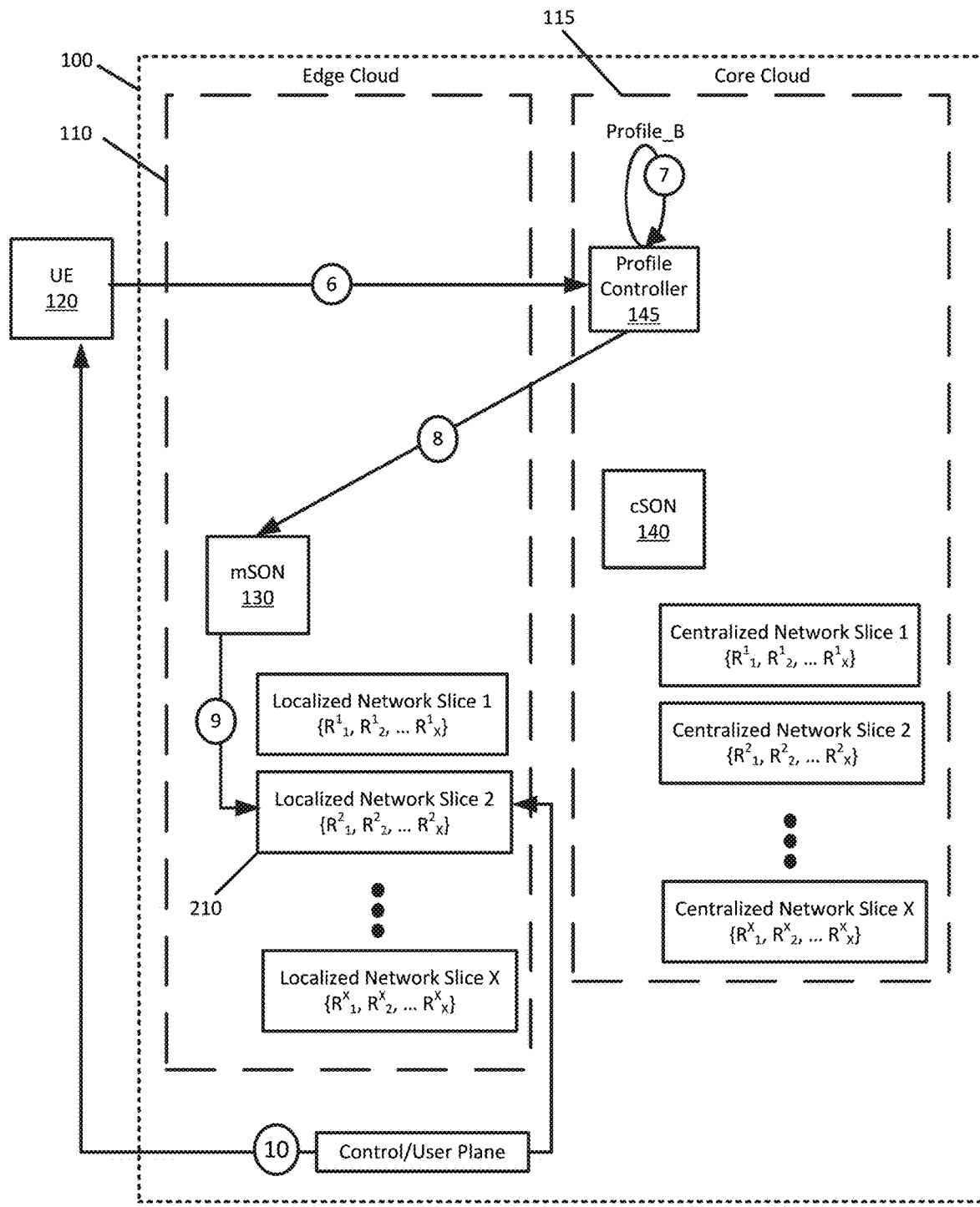
FIG. 2 illustrates an example of a middle-tier SON ("mSON") management device, operating in an edge cloud of a wireless network, according to an implementation described herein.

FIGS. 1 and 2 provide examples of dynamic resource provisioning from the core cloud and edge cloud to satisfy different requirements of different UEs or services requested by the UEs, in accordance with some embodiments. Specifically, FIG. 1 illustrates an example of a centralized Self-Organizing Network ("cSON") management device, operating in the wireless network core cloud, dynamically provisioning resources from the core cloud to provide service to a UE that is associated with a first set of requirements, wherein the first set of requirements may specify latency, reliability, caching, performance, and/or other requirements that may be satisfied using resources of the core cloud. For instance, the cSON management device may provision core cloud resources in response to UEs and/or UE service requests for streaming, content access, voice calling, and other services that may have large bandwidth, periodic communication, or other requirements. The cSON management device may operate independently of one or more middle-tier Self-Organizing Network ("mSON") management devices that operate in one or more edge clouds of the wireless network.

For instance, FIG. 2 illustrates an example of an mSON management device, operating in an edge cloud of a wireless network, dynamically provisioning resources from the edge cloud to provide sufficient service to a UE that is associated with a different second set of requirements, wherein the second set of requirements may specify latency, reliability, caching, performance, and/or other requirements that may not be satisfied using resources of the core cloud. For instance, the mSON management device may provision edge cloud resources to UEs and/or UE service requests for Ultra Reliable Low Latency Communication ("URLLC") services, and other differentiated services with low latency (e.g., latency less than about 5 milliseconds ("ms")), high reliability (e.g., errorless data transmission and/or data transmission without packet loss), and/or other requirements that are satisfied based on the proximity of the edge cloud resources to a RAN in which the UEs operate. Examples of URLLC services and other differentiated services include using data access from the wireless network for autonomous driving, remote surgery, and augmented reality.

As a result of this distributed management and provisioning of core cloud and edge cloud resources, operation and performance of the cSON management device or resources of the core cloud may not affect operation and performance of each mSON management device or resources of the different edge clouds. Accordingly, the wireless network may be adapted to provide differentiated services via the edge cloud resources and the core cloud resources.

FIG. 1 illustrates wireless network 100 with at least one edge cloud 110, core cloud 115, and UE 120 connecting to and requesting service access from wireless network 100. UE 120 may connect to wireless network 100 and access services of wireless network 100 via a particular RAN of wireless network 100.

Edge cloud 110 may include localized network resources that are part of or are physically located near the particular RAN. The resources of edge cloud 110 can be used to provide various wireless network services with low latency (e.g., less than about 10 ms) and high reliability to UEs that operate within the particular RAN, because of the geographic proximity of the resources to the particular RAN. The resources of edge cloud 110 may be limited (e.g., relative to resources of core cloud 115), and therefore may not be able to be provided to every UE 120 that operates within the particular RAN.

mSON management device 130 may manage and provision resources in edge cloud 110.

The edge cloud 110 resources may include configurable network equipment. Provisioning the resources, by operation of mSON management device 130, may include instantiating and/or configuring different virtual machines on the configurable network equipment. Specifically, provisioning the resources may include instantiating and/or configuring the configurable network equipment to interchangeably operate as one or more of a Distributed Unit ("DU"), Session Management Function ("SMF"), Access and Mobility Management Function ("AMF"), User Plane Function ("UPF"), and/or another dedicated network equipment of wireless network 100. Consequently, the configurable network equipment can be provisioned to provide different mobility management, session management, access management, radio resource management, control plane and/or user plane functionalities, and/or supplemental services from edge cloud 110.

Provisioning may further include modifying configuration parameters to tune operation of the provisioned resources based on different requirements associated with different services that may be provided by the wireless network. The configuration parameters may control operation, latency, reliability, and/or other Quality of Service ("QoS") parameters provided by the provisioned resources. Examples may include modifying Hybrid Automatic Repeat reQuest ("HARQ") parameters, the number of repetitions/retransmissions, Transmit Time Interval ("TTI") bundling parameters, handover thresholds, data and control channel power, targeted error rates, modulation and coding rates, voice and video codec rates, Physical Hybrid-ARQ Indicator Channel ("PHICH") parameters, beamforming parameters, uplink/downlink frequency scheduling, Non-Orthogonal Multiple Access ("NOMA") parameters, and/or other parameters for increased or decreased reliability, latency, throughput, bandwidth, performance, and/or other service parameters related to meeting or exceeding different requirements associated with different services that UEs may access from the wireless network. For instance, reducing the TTI duration (e.g., by using fewer Orthogonal Frequency Division Multiplexing ("OFDM") symbols per TTI and shortening OFDM symbols via wider subcarrier spacing), and lowering HARQ roundtrip time may lower latency for a resource provisioned as a DU in edge cloud 110. Similarly, reliability may be increased by using lower-rate modulation or coding rates, and by increasing the number of repetitions/retransmissions.

Core cloud 115 may include centralized network resources that are part of or located in the core network of wireless network 100. The centralized network resources of core cloud 115, like the resources of edge cloud 110, may include configurable network equipment that can be provisioned to interchangeably operate as one or more of a Central Unit ("CU"), SMF, AMF, UPF, and/or other dedicated network equipment of wireless network 100, and provide different mobility management, session management, access management, radio resource management, control plane and/or user plane functionalities, and/or supplemental services from core cloud 115. Profile controller 145 and cSON management device 140 are also shown to operate in core cloud 115.

As shown, profile controller 145 may receive (at 1) a request, from UE 120, to connect to and/or request service from the particular RAN. Profile controller 145 may obtain a profile associated with UE 120. The profile may identify requirements associated with UE 120. For instance, the profile may identify UE 120 as an autonomous vehicle, smartphone, set-top media box, Internet-of-Things ("IoT") device, sensor, appliance, or other connected device, with each identified device type being associated with a different set of requirements. The profile may, additionally or alternatively, identify various services that UE 120 is authorized to access from wireless network 100, with each service (e.g., voice, data, media streaming, compute, caching, augmented reality, autonomous driving, etc.) being associated with a different set of requirements. The requirements may specify bandwidth, data, latency, reliability or connectivity, storage/caching, and/or other requirements.

In FIG. 1, profile controller 145 may determine (at 2), based on the profile, that service access by UE 120 may be provided, within an acceptable level of service, using resources from core cloud 115. For instance, the profile may identify UE 120 to be a set-top streaming device that is authorized to access streaming media content via wireless network 100. The set-top streaming device and the media content streaming service may have high bandwidth requirements and may be latency tolerant (e.g., tolerate latency in excess of 10 ms). The requirements for the set-top streaming device may be satisfied using resources from core cloud 115.

Based on determining (at 2) that the resources of core cloud 115 can handle the requirements associated with the request (e.g., that the resources of edge cloud 110 are not needed to handle the requirements), profile controller 145 may issue (at 3) a request to provision resources, of core cloud 115, to cSON management device 140, for UE 120. cSON management device 140 may manage and provision resources in core cloud 115 by instantiating and configuring different virtualized network equipment (e.g., CU, SMF, AMF, and/or UPF) on core cloud 115 resources in order to provide different mobility management, session management, access management, radio resource management, control plane and/or user plane functionalities, and/or supplemental services from core cloud 115.

Profile controller 145 may provide the profile or service requirement information associated with UE 120 to cSON management device 140 as part of issuing the request for core cloud 115 resource provisioning. Alternatively, profile controller 145 may issue the UE request or the profile to mSON management device 130 and cSON management device 140, and each management device 130 and 140 may determine whether to provision available resources under their management.

In FIG. 1, cSON management device 140 may provision resources of core cloud 115 to a first set of network slices. Each network slice of the first set of network slices may include a different resource allocation from the core cloud that can be used to satisfy different requirements associated with different services (e.g., media streaming, voice calling, sensor management, etc.) offered through the core cloud. For instance, each network slice of the first set of network slices may have a different set of resources allocated to providing different sets of control plane, user plane, mobility management, session management, access management, radio resource management, other management services, and/or other supplemental service functionalities.

cSON management device 140 may determine a target service level agreement ("SLA") for the requirements associated with UE 120 or service requested by UE 120. For instance, the target SLA may specify requirements that encompass the access/service requirements associated with UE 120, or the services requested by UE 120. Each of the first set of network slices may be mapped to a different SLA, with each network slice of the first set of network slices being provisioned with different sets of core cloud 115 resources for satisfying different requirements associated with a different SLA. In this example, network slice 150 is provisioned (at 4) with core cloud 115 resources that can satisfy requirements associated with the target SLA. cSON management device 140 may obtain network measurements from the resources provisioned to network slice 150 in order to verify that the target SLA requirements can be met, and that the resources provisioned to the network slice 150 are available to provide service to UE 120. cSON management device 140 may provide (at 5) UE 120 access to wireless network 100 services via the provisioned resources of network slice 150 in response to verifying the requirements and resource availability. Other UEs accessing similar services as UE 120 with similar requirements may also obtain access via resources of network slice 150.

In FIG. 2, profile controller 145 may receive (at 6) a different request, from the same or different UE 120, to connect to and/or request a different service from the particular RAN. Profile controller 145 may obtain (at 7) a different second profile based on the different request. Profile controller 145 may determine, based on the second profile, that requirements associated with UE 120 may not be provided, within an acceptable level of service, using resources from core cloud 115. Accordingly, profile controller 145 may issue (at 8) the request or the second profile to mSON management device 130 for edge cloud 110 resource provisioning.

mSON management device 130 may provision resources of edge cloud 110 to a second set of network slices. Each of the second set of network slices may be mapped to a different SLA, with each of the second set of network slices being provisioned with different sets of core cloud 115 resources for satisfying different requirements associated with a different SLA.

mSON management device 130 may determine (at 9) that the SLA associated with network slice 210 satisfies the service/access requirements of UE 120 or services requested by UE 120. Accordingly, mSON management device 130 may provide (at 10) UE 120 access to wireless network 100 services via the provisioned resources of network slice 210.

Figure 3:
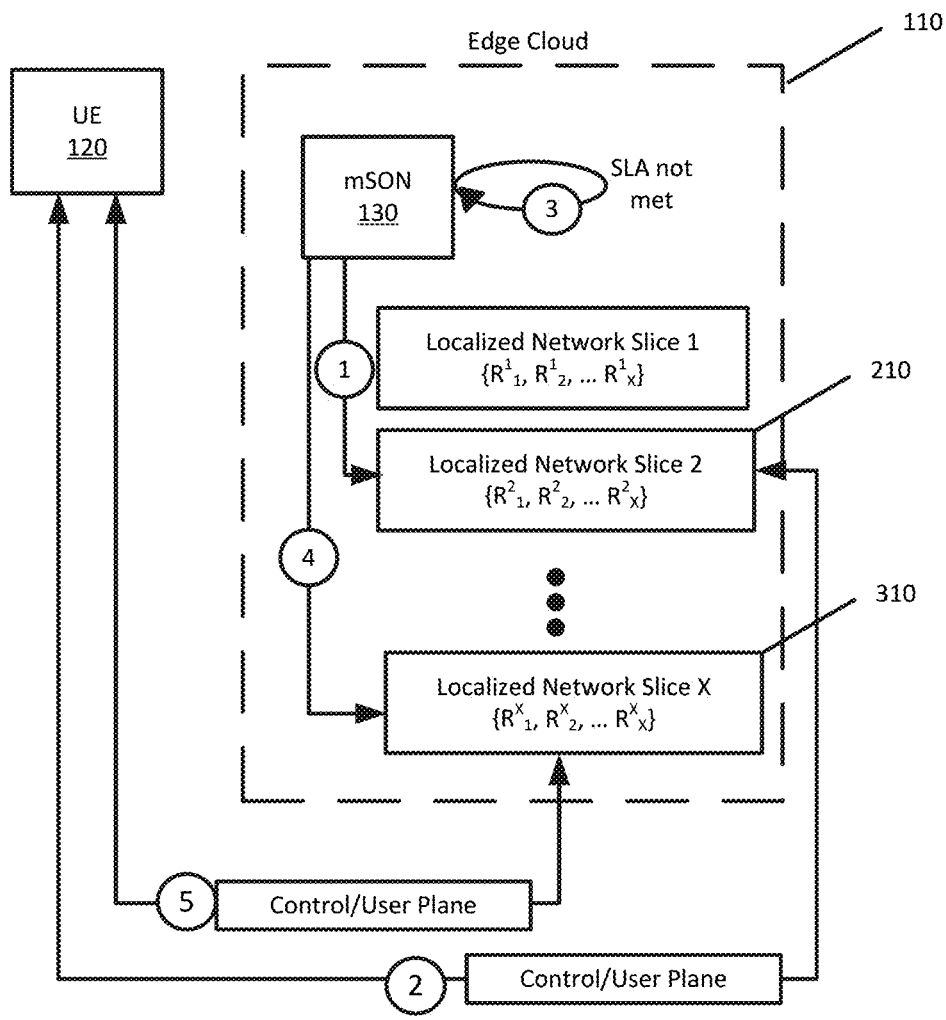
FIG. 3 provides an example of an mSON management device according to an implementation described herein.

Further, in some embodiments, mSON management device 130 may monitor network slice 210 in order to determine whether the resources provisioned to network slice 210 provide UE 120 with a sufficient level of service throughout the session or service duration. FIG. 3 provides an example of mSON management device 130 provisioning additional resources or changing the resource allocation in response to a current resource allocation that does not meet access requirements that are associated with UE 120 or a service that UE 120 accesses via wireless network 100. In this example, mSON management device 130 improves service by providing UE 120 wireless network 100 access via network slice 210 and network slice 310, or by switching access from network slice 210 to network slice 310.

Figure 4:
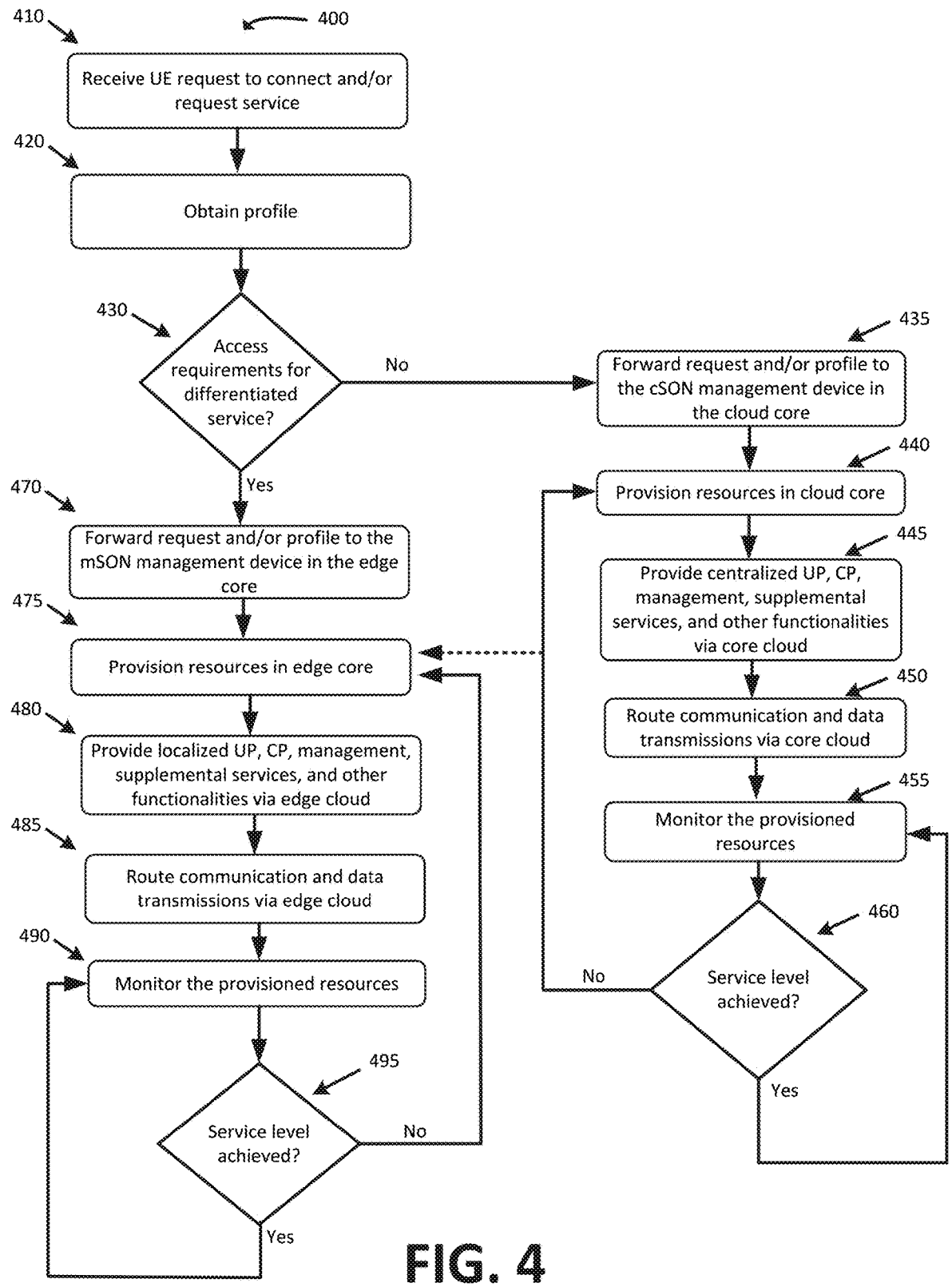
FIG. 4 provides an overview process for a distributed resource management according to an implementation described herein.

FIG. 4 provides an overview process 400 for a distributed resource management based on the separate management and provisioning of resources in edge cloud 110 and core cloud 115 of wireless network 100. In some embodiments, process 400 may be performed by one or more of profile controller 145, mSON management device 130, and/or cSON management device 140. In some embodiments, process 400 may be additionally, or alternatively, be performing by one or more other devices, such as different mSON management devices operating in different edge clouds of wireless network 100.

Process 400 may include receiving (at 410) a UE request to connect and/or request service. For instance, profile controller 145 may receive a request that originates from UE 120 as a result of UE 120 attempting to connect and/or request service from the particular RAN that is associated with edge cloud 110.

Process 400 may also include obtaining (at 420) a profile based on the request. For example, profile controller 145 may use a unique identifier associated with UE 120 to obtain (at 420) the profile. The unique identifier may be one or more of the International Mobile Equipment Identity ("IMEI"), Mobile Equipment Identifier ("MEID"), Electronic Serial Number ("ESN"), International Mobile Subscriber Identity ("IMSI"), Media Access Control ("MAC") address, and/or other unique values that are associated with UE 120.

Process 400 may further include determining (at 430), based on the obtained (at 420) profile, whether requirements associated with UE 120, or requirements associated with the service being requested by UE 120 exceed one or more thresholds set for URLLC and/or another differentiated service. The URLLC or other differentiated service can be defined according to any one or more of the latency, reliability, and/or other requirements. The profile may identify the UE type (e.g., autonomous vehicle, smartphone, augmented reality system, etc.) and specify different requirements associated with each type. The profile may also identify different services the requesting UE is authorized to access (e.g., streaming, autonomous driving, caching, etc.), and may specify different requirements associated with each authorized service.

In response to determining (at 430—No) that access by UE 120 can be provided without differentiated service, the request and/or profile may be forwarded (at 435) to cSON management device 140 in core cloud 115.

Process 400 may further include provisioning (at 440) resources within core cloud 115. For example, cSON management device 140 may provision (at 440) the configurable network equipment in core cloud 115 to provide various centralized control plane, user plane, management (e.g., mobility management, session management, access management, radio resource management, other management services), supplemental services, and/or other functionalities to UE 120 based on the requirements associated with UE 120. The supplemental services may include caching services, compute services, application-specific services (e.g., Internet Protocol Multimedia Subsystem servers and Vehicle-to-Everything servers), and/or other services. cSON management device 140 may alternatively provision (at 440) resources of core cloud 115 to a set of network slices, and map each network slice to a different target SLA based on services, functionalities, and performance characteristics of the resources provisioned to each network slice. In provisioning (at 440) the resources, cSON management device 140 may select, based access requirements associated with the obtained (at 420) profile, a particular network slice that is mapped to a target SLA that meets or exceed requirements of UE 120 or services requested by UE 120.

Process 400 may additionally include providing (at 445) centralized control plane, user plane, management (e.g., mobility management, session management, access management, radio resource management, other management services), supplemental services, and/or other functionalities to UE 120 from the provisioned resources of core cloud 115. For instance, the resources from core cloud 115, provisioned (at 440) by cSON management device 140, operate to provide (at 445) wireless network service to UE 120.

Process 400 may also include routing (at 450) communications and data transmissions via core cloud 115. For example, communications and data transmissions exchanged between UE 120, wireless network 100, and/or external networks may be routed through the provisioned resources of core cloud 115.

Process 400 may also include monitoring (at 455) the provisioned resources of core cloud 115. For instance, cSON management device 140 may monitor latency, packet loss, bandwidth, and other performance parameters of the provisioned resources. The monitoring may be continuous, periodic, or event based (e.g., UE 120 moves to a different area, network congestion changes, signal strength falls below a threshold, etc.).

Based on the monitoring (at 455), process 400 may determine (at 460) whether the provisioned resources of core cloud 115 (e.g., a particular network slice) provide UE 120 with a sufficient level of service (for instance, whether access by UE 120 via the provisioned resources of core cloud 115 meets or exceeds requirements of the target SLA). The determination may be based on monitoring, and specifically, based on whether the monitored parameters deviate, by some threshold amount, from expected parameters of the target SLA. For example, cSON management device 140 may determine that the service level is not achieved when the monitored actual latency provided by the provisioned resources (e.g., 13 ms) is 3 ms or more than the latency of the target SLA (e.g., 10 ms), the monitored actual packet loss is 10% more than the packet loss of the target SLA, and/or the monitored actual bandwidth (e.g., 8 Megabits per second ("Mbps")) is 10% less than the bandwidth of the target SLA (e.g., 10 Mbps).

If a sufficient level of service is determined (at 460—Yes) to be provided by the current provisioning of core cloud 115 resources, the process may continue to monitor (at 455) the provisioned resources of core cloud 115 until the session or service access ends. If a sufficient level of service is determined (at 460—No) to not be provided by the current provisioning of core cloud 115 resources, cSON management device 140 may provision (at 440) additional resources or reconfigure the current provisioning of core cloud 115 resources to improve the control plane, user plane, management, supplemental services, and/or other functionalities.

In some embodiments, if it is determined that core cloud 115 is not providing the sufficient level of service (460—No), then process 400 may proceed to block 475. In other words, if core cloud 115 is unable to provide, and/or is for some reason not providing the sufficient level of service, then resources of edge cloud 110 may alternatively, or additionally, be provisioned in order to provide the sufficient level of service. In some embodiments, this determination may be made if it is determined (at 460) over a window of time (e.g., about 30 seconds, two minutes, one hour, etc.) that the sufficient level of service is not being provided by core cloud 115. In some embodiments, this determination may be made in any other suitable manner.

In response to determining (at 430—Yes) that access by UE 120 requires differentiated service, the request and/or profile may be forwarded (at 470) to mSON management device 130.

Process 400 may further include provisioning (at 475) resources within edge cloud 110. For example, mSON management device 130 may provision (at 475) the configurable network equipment in edge cloud 110 to provide various centralized control plane, user plane, management (e.g., mobility management, session management, access management, radio resource management, other management services), supplemental services, and/or other functionalities to UE 120 based on the requirements associated with UE 120. mSON management device 130 may alternatively provision (at 475) resources of edge cloud 110 to a set of network slices, and map each network slice to a different target SLA based on services, functionalities, and performance characteristics of the resources provisioned to each network slice. In provisioning (at 475) the resources, mSON management device 130 may select, based access requirements associated with the obtained (at 420) profile, a particular network slice that is mapped to a target SLA that meets or exceed requirements of UE 120 or services requested by UE 120.

Process 400 may additionally include providing (at 480) localized control plane, user plane, management (e.g., mobility management, session management, access management, radio resource management, other management services), supplemental services, and/or other functionalities to UE 120 from the provisioned resources of edge cloud 110. For instance, the resources from core cloud 110, provisioned (at 475) by mSON management device 130, operate to provide (at 480) wireless network service to UE 120.

Process 400 may also include routing (at 485) communications and data transmissions via edge cloud 110. For example, communications and data transmissions exchanged between UE 120, wireless network 100, and/or external networks may be routed through the provisioned resources of edge cloud 110.

Process 400 may also include monitoring (at 490) the provisioned resources of edge cloud 110. For instance, mSON management device 130 may monitor latency, packet loss, bandwidth, and other performance parameters of the provisioned resources.

Based on the monitoring (at 490), process 400 may determine (at 495) whether the provisioned resources of edge cloud 115 provide UE 120 with a sufficient level of service (for instance, whether access by UE 120 via the provisioned resources of core cloud 115 meets or exceeds requirements of the target SLA for URLLC).

If a sufficient level of service is determined (at 495—Yes) to be provided by the current provisioning of edge cloud 110 resources, the process may continue to monitor (at 490) the provisioned resources of edge cloud 110 until the session or service access ends. If a sufficient level of service is determined (at 495—No) to not be provided by the current provisioning of edge cloud 110 resources, mSON management device 130 may provision (at 475) additional resources or reconfigure the previously provisioned edge cloud 110 resources, as is illustrated above in FIG. 3, to improve the control plane, user plane, management, supplemental services, and/or other functionalities.

In some embodiments, the distributed resource management may result in control plane and user plane functionalities that are virtualized and provided by resources of edge cloud 110, core cloud 115, or different combinations of both clouds 110 and 115. For instance, a first set of control plane and/or user plane functionalities may be provided using resources mSON management device 130 provisions from edge cloud 110, and a different second set of control plane and/or user plane functionalities are provided using resources cSON management device 140 provisions from core cloud 115. The provisioning may further include changing parameters for each of the different control plane and/or user plane functionalities provided from resources of edge cloud 110, core cloud 115, or some combination of both.

While discussed above in the context of selecting resources of edge cloud 110 or core cloud 115 for a particular UE 120, in some embodiments, profile controller 145 may initiate the simultaneous provisioning of resources in both edge cloud 110 and core cloud 115 for UE 120. For example, different types of communications (e.g., which correspond to different applications, such as voice calling, video conferencing, autonomous driving, IoT device messaging, etc.) may be routed through different resources (e.g., different network slices) of edge cloud 110 and/or core cloud 115, for the same UE 120. Additionally, in some embodiments, uplink and downlink traffic may be classified differently. For example, voice call traffic in the uplink direction (e.g., from UE 120) may be routed through edge cloud 110, while the same type of traffic (e.g., voice call traffic) in the downlink direction (e.g., to UE 120) may be routed through core cloud 115. Additionally, in some embodiments, control plane and user plane messaging may be split across edge cloud 110 and core cloud 115 (e.g., control plane messages may be routed through edge cloud 110, while user plane data may be routed through core cloud 115, or vice versa).

In order to provide services via core cloud 110 and edge cloud 115 simultaneously, as discussed above, profile controller 145 may initiate the splitting of the control plane and user plane functionalities across edge cloud 110 and core cloud 115. Profile controller 145 may obtain a profile that may be associated with requirements that can be satisfied based on a provisioning of different resources from edge cloud 110 and core cloud 115. Profile controller 145 may issue different resource provisioning requests to mSON management device 130 and cSON management device 140, or may send the obtained profile to each management device 130 and 140. Each management device 130 and 140 may determine what resources to provision upon receiving the profile.

In some embodiments, traffic according to different layers (e.g., Radio Resource Control ("RRC"), Packet Data Convergence Protocol ("PDCP"), Radio Link Control ("RLC"), Medium Access Control ("MAC"), Physical ("PHY") layer, and Radio Frequency ("RF") layers) may be implemented across edge cloud 110 and core cloud 115 resources. For example, in order to enhance reliability, speed, and/or other performance metrics, lower layers (e.g., the RF, PHY, MAC layers) may be implemented by resources of edge cloud 115 (and mSON management device 130 may provision resources of edge cloud 115 accordingly), while higher layers (e.g., the RLC, PDCP, and RRC) layers may be implemented by resources of edge cloud 110 (and cSON management device 140 may provision resources of core cloud 110 accordingly). As discussed above, the resources may be provisioned on a per-UE 120 basis. Additionally, in practice, different layers may be implemented by resources of the different clouds (e.g., networks). For instance, in some embodiments, the RF, PHY, and MAC layers may be implemented by edge cloud 115 for a first UE 120, while the RF, PHY, MAC, RLC, PDCP, and RRC layers may be implemented by edge cloud 115 for a second UE 120.

Examples of RRC functionalities may include connection establishment and release functions, broadcasting of system information, radio bearer establishment, reconfiguration, release, RRC connection mobility procedures, and/or paging notification. Examples of PDCP functionalities may include transfer of control plane and user plane data, header compression, ciphering, and/or integrity protection. Examples of RLC functionalities may include transferring Protocol Data Units ("PDUs") via an acknowledged, unacknowledged, or transparent mode, error correction, Service Data Unit ("SDU") concatenation, segmentation, and reassembly, PDU re-segmentation, duplicate detection, RLC SDU discard, RLC re-establishment, and/or protocol error detection and recovery. Examples of MAC functionalities may include mapping between logical channels and transport channels, multiplexing by composing and decomposing PDUs, logical channel prioritization, and/or HARQ signaling. Examples of PHY functionalities may include performing OFDM and/or Multiple Input Multiple Output ("MIMO") data transmission. Examples of RF functionalities may include beamforming, signal processing, modulation. Additional control plane and/or user plane functionalities that enable communication and access in 5G, 4G Long Term Evolution ("LTE"), or other wireless networks may be provisioned by either mSON management device 130 or cSON management device 140.

mSON management device 130 may provision at least the RF functionalities on edge cloud 110 resources. mSON management device 130 may optionally provision functionalities for each of the next higher layers (e.g., the PHY functionalities) on edge cloud 110 resources, and cSON management device 140 may provision the functionalities of the remaining layers on core cloud 115 resources. For instance, mSON management device 130 may provision one or more of the RRC, PDCP, RLC, MAC, PHY, and RF functionalities on virtualized DU instances in edge cloud 110. cSON management device 140 may provision one or more of the RRC, PDCP, RLC, MAC, PHY, and RF functionalities on virtualized CU instances in core cloud 115. Different virtualized DU and/or CU instances may provide different functionalities. For example, a first set of UEs 120 may access a first virtualized DU instance in edge cloud 110 providing all user plane functionalities, whereas a second set of UEs 120 may access a different second virtualized DU instance providing a subset of user plane functionalities.

The localization and centralization of the content plane and/or user plane functionalities may be based on the access requirements that are associated with UE 120 or services requested by UE 120. For example, mSON management device 130 may provision the PDCP, RLC, MAC, PHY, and RF functionalities on resources of edge cloud 110, and cSON management device 140 may provision the RRC functionalities on resources of core cloud 115. This provisioning example may place the entire user plane in edge cloud 110 when UE 120 or services accessed by UE 120 requires low latency and high reliability service.

Figure 5:
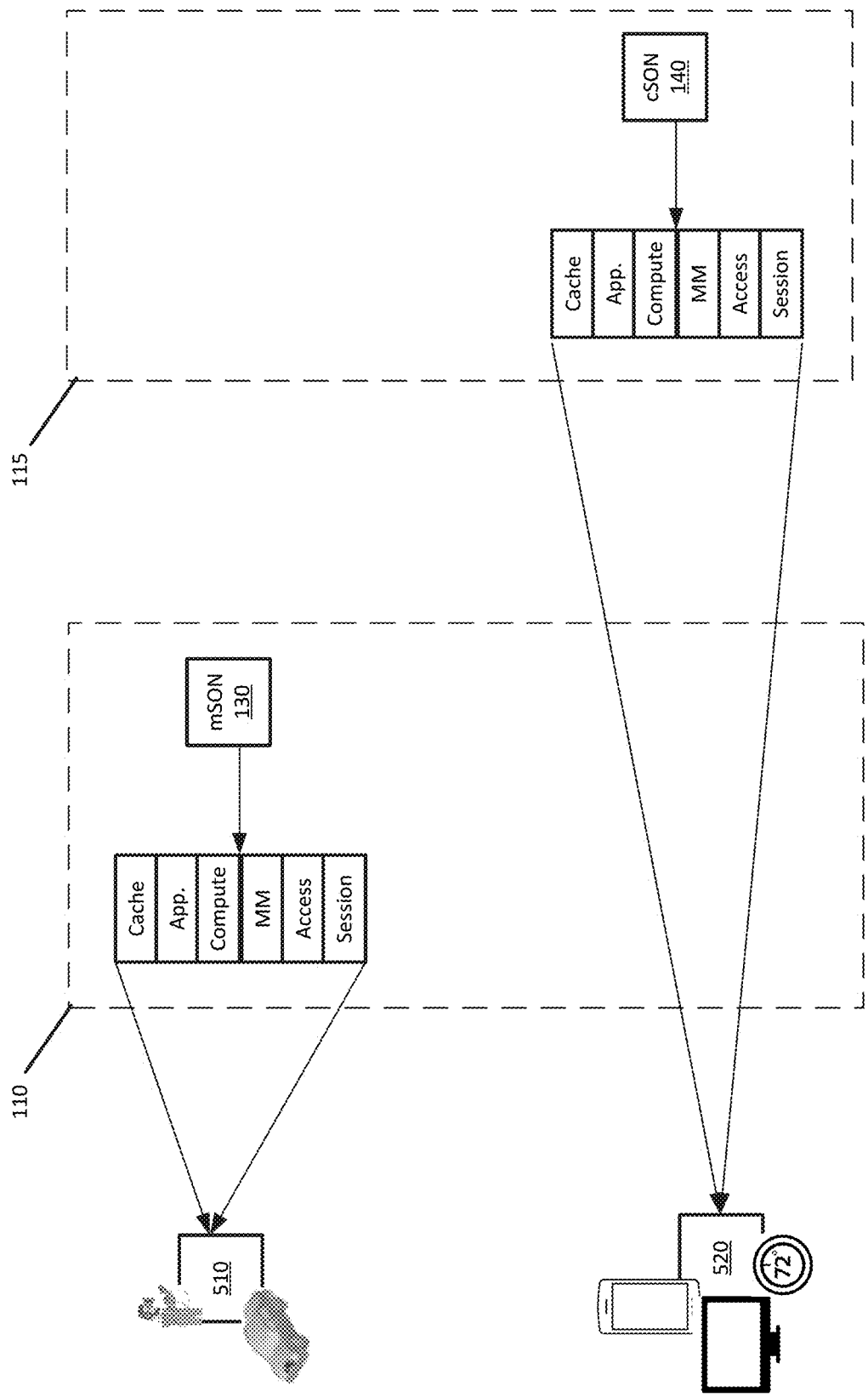
FIG. 5 illustrates an example of an mSON management device provisioning according to an implementation described herein.

The management devices 130 and 140 may also provision each of the control plane and/or user plane functionalities separately for uplink and downlink transmissions on resources of edge cloud 110 and core cloud 115. For instance, mSON management device 130 may provision the RLC, MAC, PHY, and RF functionalities on resources of edge cloud 110 for downlink transmissions, and cSON management device 140 may provision the RLC, MAC, PHY, and RF functionalities on resources of core cloud 115 for uplink transmissions. Moreover, functionalities of the individual layers may also be split across the different cloud resources. For instance, the RLC functionalities may be split to high and low sublayers, and may be provisioned separately by mSON management device 130 and cSON management device 140. The low-RLC sublayer may provide segmentation functions, and the high-RLC sublayer may provide the RLC functions.

mSON management device 130 and cSON management device 140 may also provision mobility management, session management, access management, radio resource management, other management services, and/or other supplemental services across resources of edge cloud 110 and core cloud 115. For instance, FIG. 5 illustrates an example of mSON management device 130 provisioning various management and supplemental services in edge cloud 110 for access by a first set of UEs 510 (e.g., autonomous vehicles, augmented reality devices, and/or other URLLC devices), and cSON management device 140 provisioning similar management and supplemental services in core cloud 115 for access by a different set of UEs 520 (e.g., smartphones, set-top boxes, sensors, and/or other non-URLLC devices).

mSON management device 130 may provision one or more of the mobility management, session management, access management, radio resource management, other management services, and/or other supplemental services on virtualized SMF, AMF, and UDF instances in edge cloud 110. cSON management device 140 may provision one or more of the mobility management, session management, access management, radio resource management, other management services, and/or other supplemental services on virtualized SMF, AMF, and UDF instances in core cloud 115.

Figure 6:
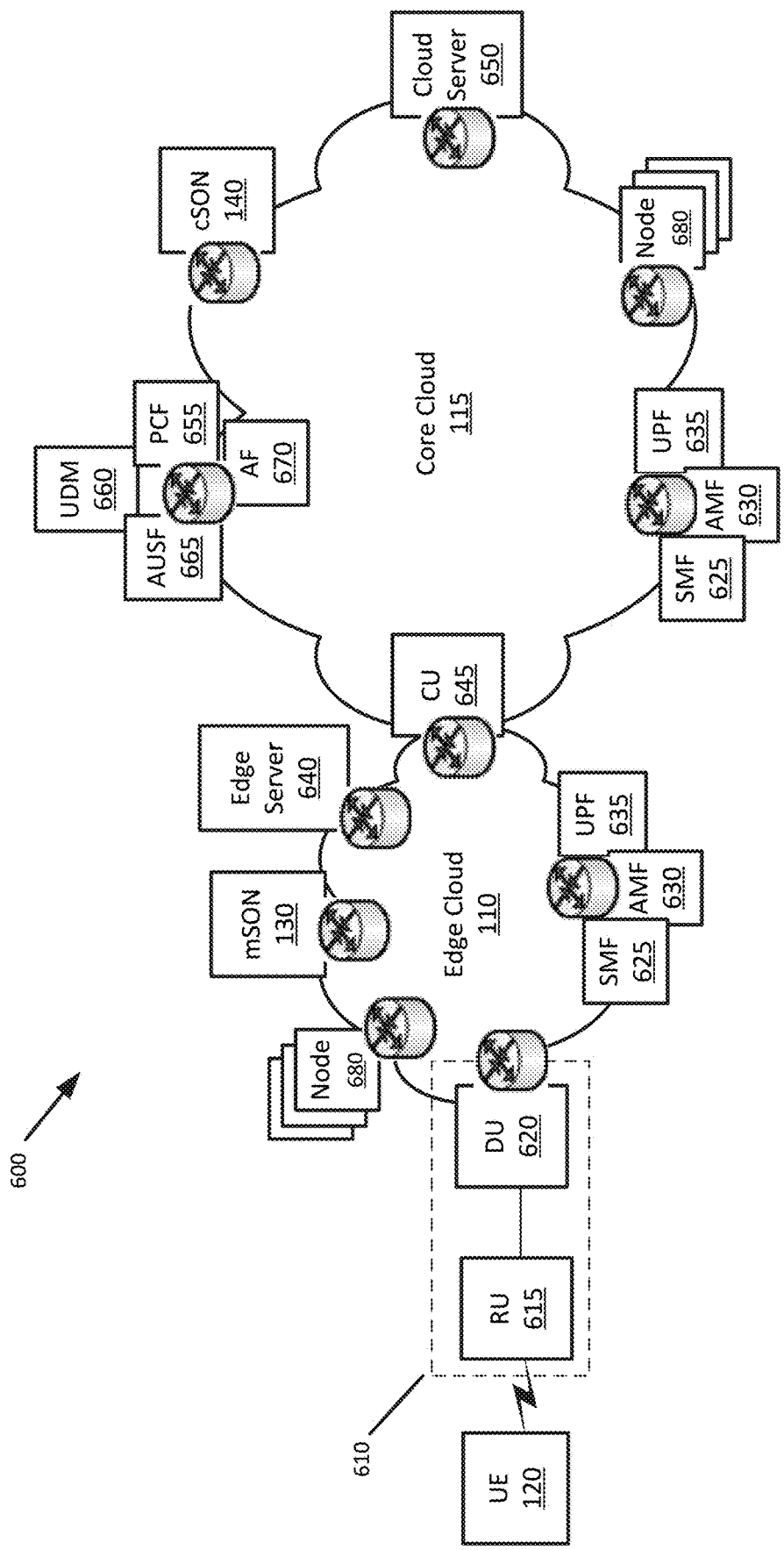
FIG. 6 provides an example environment for the wireless network.

FIG. 6 provides an example environment 600 for wireless network 100. As shown, environment 600 includes RAN 610, edge cloud 110, and core cloud 115.

RAN 610 may include Radio Unit ("RU") 615 and DU 620. Wireless network 100 may deploy several RANs 610 to provide coverage over different geographic regions.

RU 615 may provide the air or radio interface by which UE 120 connects and communicates with wireless network 100 and other network-enabled devices 120 via wireless network 100. RU 615 may host different radio frequencies, and may connect to one or more DUs 620 via a fiber-optic or other network link.

DU 620 may include one or more virtualized DU instances provisioned by mSON management device 130. In other words, DU 620 may be configurable network equipment that can be provisioned and/or configured by mSON management device 130 with different control plane and/or user plane functionalities (e.g., the RRC, PDCP, RLC, MAC, PHY, RF, and other control plane and/or user plane functionalities). DU 620 may be configured to provide different control plane and/or user plane functionalities for different UEs 120 connecting to wireless network 100 through a corresponding RU 615 associated with DU 620. For instance, mSON management device 130 may provision DU 620 to provide more control plane and user plane functionalities locally (e.g., via resources in edge cloud 110) for a first set of UEs 120, while offloading some of the same control plane and user plane functionalities to core cloud 115 for a different second set of UEs 120. The one or more resources (e.g., configurable network equipment) hosting the virtualized DU 620 instances may be located with other resources of edge cloud 110. Other dedicated DUs 620 (e.g., non-configurable devices) may be located in edge cloud 110.

mSON management device 130 may also provision virtualized instances of SMF 625, AMF 630, UPF 635, and/or other network equipment providing mobility management, session management, access management, radio resource management, other management services, and/or supplemental services on edge cloud 110 resources. SMF 625 may perform session establishment, modification, and release, UE address allocation and management, selection and control of the user plane function, and/or configuration of traffic steering to route traffic to a proper destination. AMF 630 may perform UE 120 registration management, connection management, reachability management, mobility management, and/or authentication and access authorization. UPF 630 may perform packet routing and forwarding, packet inspection as part of user plane policy rule enforcement, transport level packet marking, packet buffering, and/or notification triggering. Other dedicated SMF 625, AMF 630, and UPF 635 may operate in edge cloud 110.

Edge server 640 may be one or more configurable computing devices or servers that operate from within edge cloud 110. mSON management device 130 may provision edge server 640 to provide various supplemental services that are unrelated to control plane or user plane functionalities. For instance, mSON management device 130 may provision, on edge server 640, caching services, compute services, application-specific services, and other services that wireless network 100 or its customers or partners desire to execute from within edge cloud 110 with geographic proximity to UEs 120 that connect and access wireless network 100 services via RAN 610.

Edge cloud 110 may also include various nodes 680. Nodes 680 may represent available resources of edge cloud 110 that mSON management device 130 may provision to provide any of the above identified functionalities. Nodes 680, as well as any of DU 620, SMF 625, AMF 630, UPF 635, edge server 640, may be one or more configurable network equipment that run a Software-Defined Networking ("SDN") controller (e.g., OpenFlow SDN). mSON management device 130 can access the configurable network equipment (e.g., nodes 680) via the respective SDN controller, and may use Network Function Virtualization ("NFV") to provision the configurable network equipment with the desired services or functionalities.

mSON management device 130 may monitor resource availability and usage in edge cloud 110 via the SDN controller. In other words, mSON management device 130 may periodically connect to each of the deployed configurable resources in edge cloud 110 (e.g., configurable network equipment such as nodes 680), via the respective SDN controller of each resource, in order to track resource usage and identify which resources can be provisioned to provide additional control plane, user plane, SMF 625, AMF 630, UPF 635, edge server 640, and/or other functionality. For instance, mSON management device 130 may monitor bandwidth, processor usage, memory usage, latency, packet loss, established connections, and/or other metrics associated with each configurable network device.

Environment 600 may have different edge clouds 110 for different geographic regions serviced by the wireless network. Each edge cloud 110 may have a separate mSON management device 130 controlling resource provisioning for that edge cloud 110. In some embodiments, one mSON management device 130 may control resource provisioning for two or more edge clouds 110.

Like edge cloud 110, core cloud 115 may include one or more nodes 680. cSON management device 140 can provision nodes 680 in core cloud 115 as one or more CU 645, SMF 625, AMF 630, UPF 635, and/or cloud server 650 components. Core cloud 115 may also include dedicated CU 645, AMF 630, and UPF 635 components.

Each CU 645 (e.g., whether virtualized or dedicated) may connect to one or more DUs 620 via a front-haul interface (e.g., Fs interface). CU 645 may provide a complimentary function to a connected DU 620. cSON management device 140 may provision CU 645 to provide control plane and user plane functionality that is not provided by DU 620. For instance, mSON management device 130 may provision DU 620 to provide a first set of control plane and user plane functionality locally in edge cloud 110, to meet latency sensitive requirements associated with UE 120, and cSON management device 140 may provision CU 645 to provide the remainder of the control plane and user plane functionality that is not provided by DU 620, to meet other latency tolerant requirements associated with UE 120.

Cloud server 650 may operate in core cloud 115 in a similar manner as edge server 640 in edge cloud 110. For instance, cloud server 650 may be one or more configurable computing devices or servers that cSON management device 150 may provision edge server 640 to provide various supplemental services including caching services, compute services, application-specific services, and other services that wireless network 100 or its customers or partners desire to execute from within core cloud 115.

Core cloud 115 may further include one or more of Policy Control Function ("PCF") 655, Unified Data Management ("UDM") 660, Authentication Server Function ("AUSF") 665, and Application Function ("AF") 670. PCF 655 may receive information regarding profiles, policies and/or subscriptions from one or more sources, such as subscriber databases and/or from one or more users (such as, for example, an administrator associated with PCF 655). Based on the information, PCF 655 may determine mobility and session management policies for SMF 625 and/or AMF 630. UDM 660 and AUSF 665 may manage, update, and/or store, in one or more memory devices associated with UDM 660 and/or AUSF 665, profile information associated with a subscriber. UDM 660 and AUSF 665 may perform authentication, authorization, and/or accounting operations associated with the subscriber and/or a communication session with UE 120. AF 670 may receive, store, and/or provide information that may be used in determining parameters (e.g., quality of service parameters, charging parameters, or the like) for certain applications. AF 670 may maintain the information on a per-application basis, in some embodiments. PCF 655, UDM 660, AUSF 665, and AF 670 may be dedicated network equipment of core cloud 115, or virtualized instances running on nodes 680 of core cloud 115. Profile controller 145 can operate as or in conjunction with one or more of PCF 655, UDM 660, AUSF 665, or AF 670.

cSON management device 140 may monitor resource availability and usage in core cloud 115. For instance, mSON management device 130 may periodically connect to each of the deployed configurable resources in core cloud 115, via an SDN controller of each resource, in order to track resource usage and identify which resources can be provisioned to provide additional control plane, user plane, SMF 625, AMF 630, UPF 635, cloud server 650, and/or other functionality.

FIG. 6 illustrates mSON management device 130 and cSON management device 140 as standalone devices that operate independent of other edge cloud 110 resources and core cloud 115 resources. In some embodiments, mSON management device 130 may be implemented as a set of distributed instances. Each mSON management device 130 instance may run on a different node 680, resource, or configurable network equipment located in edge cloud 110. Similarly, cSON management device 140 may be implemented as a set of distributed instances that each run on a node 680, resource, or configurable network equipment located in core cloud 115. The distributed instances in a particular cloud may communicate with one another to determine an optimal provisioning of resources, and each instance may control the provisioning on a respective cloud resource on which the instance executes.

Figure 7:
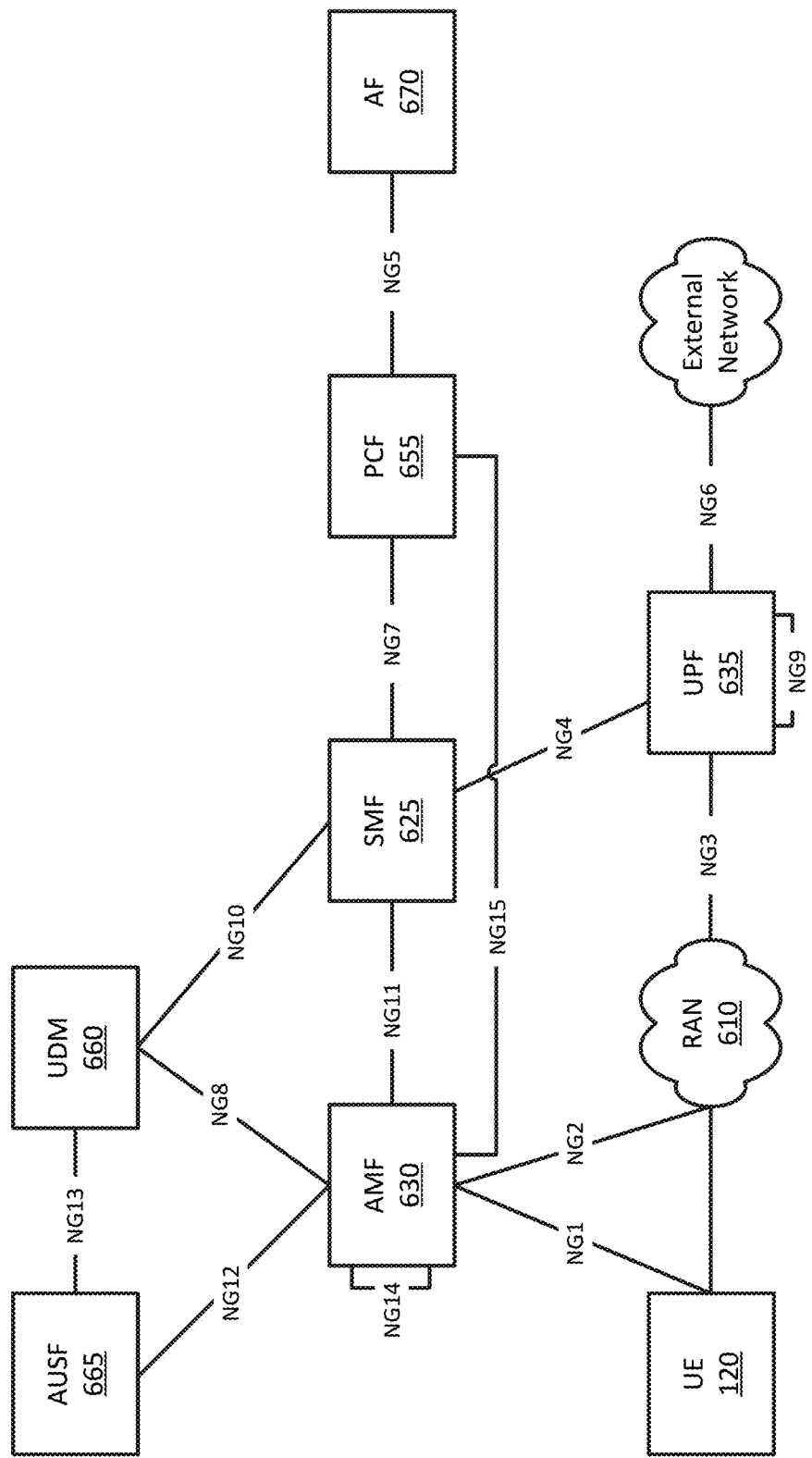
FIG. 7 provides an example functional arrangement of the core cloud network components.

FIG. 7 provides an example functional arrangement of core cloud 115 network components illustrated in environment 600. FIG. 6 and FIG. 7 are illustrative of a next generation network, such as a 5G wireless network in which the distributed resource management may be implemented. The distributed resource management may be implemented for other wireless network architectures other than the 5G wireless network illustrated in FIG. 6 and FIG. 7.

Figure 8:
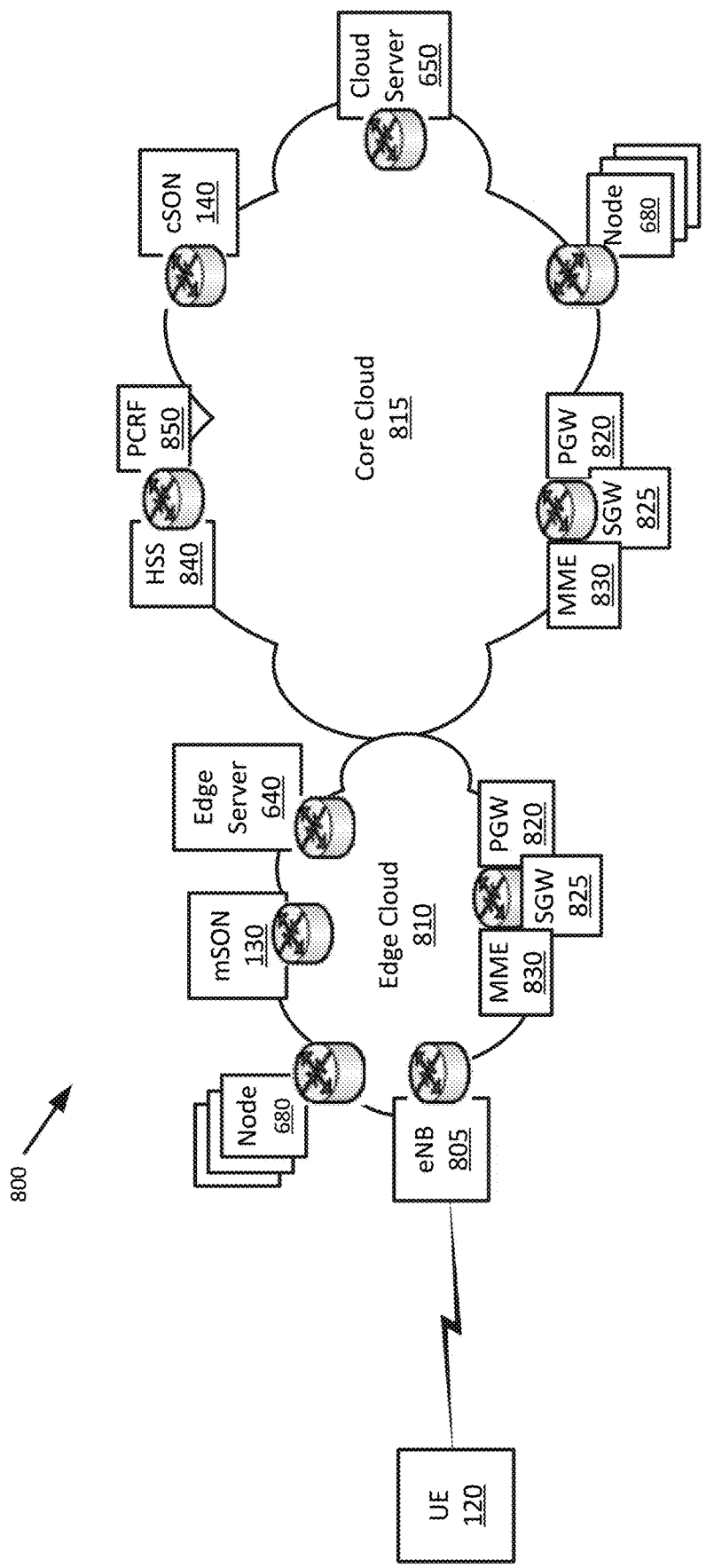
FIG. 8 illustrates another example environment, in which one or more embodiments may be implemented.

FIG. 8 illustrates another example environment 800, in which one or more embodiments may be implemented. In some embodiments, environment 800 may be, or may include, a 4G LTE wireless network. Environment 800 may include one or more RANs (represented by evolved Node B ("eNodeB") 805), edge cloud 810, and core cloud 815.

Core cloud 815 may include Packet Data Network Gateway ("PGW") 820, Serving Gateway ("SGW") 825, Mobility Management Entity ("MME") 830, Home Subscriber Server ("HSS") 840, Policy and Charging Rules Function ("PCRF") 850, and/or other 4G LTE network devices or systems.

PGW 820 may aggregate and send traffic between SGW 810 and an external network. SGW 825 may aggregate and send traffic between one or more RANs (e.g., eNodeBs 805) and PGW 820, and may provide various user plane functionalities (e.g., user data or bearer traffic). MME 830 may act as a control node for RANs and/or other devices that provide the air interface for the wireless telecommunication network. In other words, MME 830 may provide various control plane functionalities (e.g., UE registration, bearer channel establishment, hand off, and/or to perform other operations). HSS 840 may manage, update, and/or store, in a memory associated with HSS 840, profiles associated with a subscriber (e.g., a subscriber associated with a UE). The profiles may identify applications and/or services that are permitted for and/or accessible by the subscriber, a Mobile Directory Number (MDN) associated with the subscriber, bandwidth or data rate thresholds associated with the applications and/or services, and/or other information. Additionally, or alternatively, HSS 840 may perform authentication, authorization, and/or accounting operations associated with the subscriber and/or a communication session with a UE. PCRF 850 may receive information regarding policies and/or subscriptions from one or more sources, such as subscriber databases and/or from one or more users. PCRF 850 may provide these policies to PGW 820 or another device (e.g., SGW 810) so that the policies can be enforced. In wireless network 800, profile controller 145 can operate as or in conjunction with one or more of HSS 840 or PCRF 850.

The functionalities of PGW 820, SGW 825, MME 830, and/or other network components may be virtualized and provided by nodes 680, resources, or configurable network equipment in edge cloud 810, or may be virtualized and provided using nodes 680, resources, or configurable network equipment located in core cloud 815 of 4G LTE wireless network 800. Management devices 130 and 140 may also provision virtualized control plane and user plane functionality between edge cloud 810 and core cloud 815. For instance, mSON management device 130 may provision a first set of virtualized control plane and/or user plane functionality to eNodeB 870, and cSON management device 140 may provision a different second set of virtualized control plane and/or user plane functionality across PGW 820, SGW 825, and MME 830.

Figure 9:
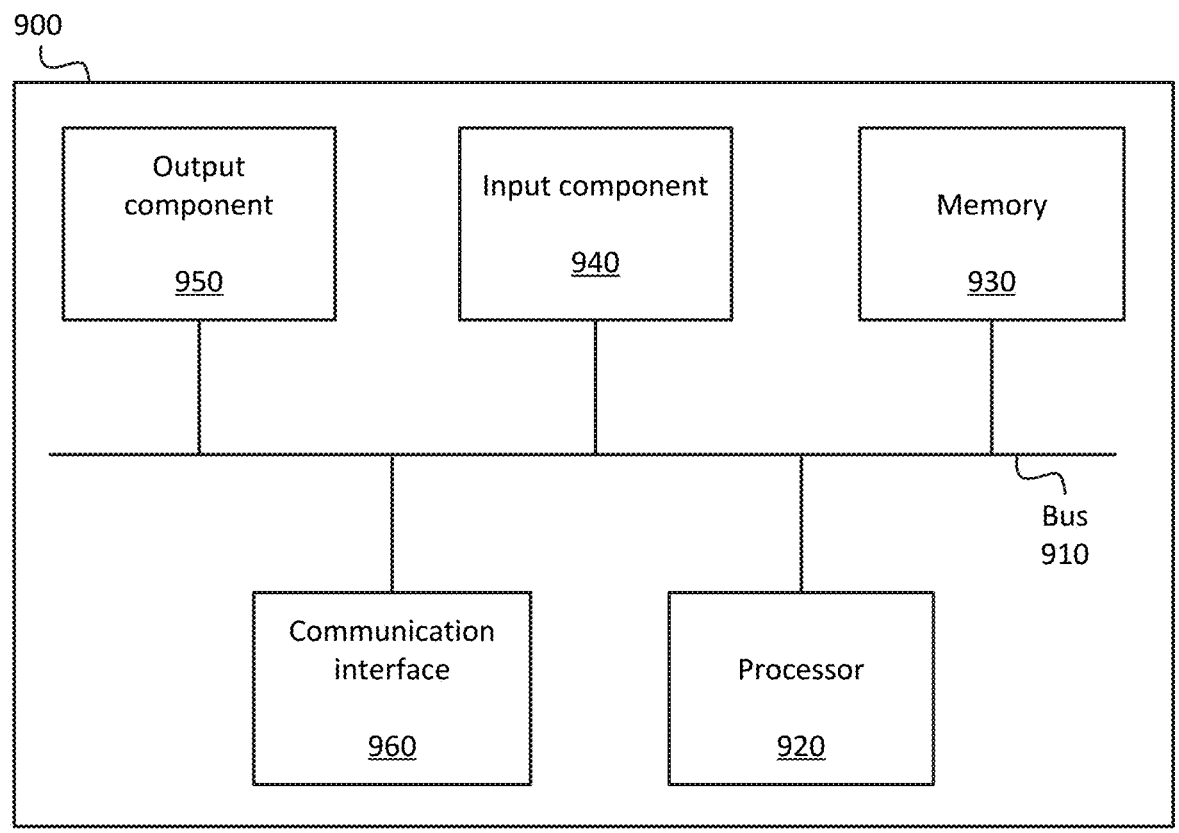
FIG. 9 illustrates example components of one or more devices, according to one or more embodiments described herein.

FIG. 9 is a diagram of example components of device 900. Device 900 may be used to implement certain of the devices described above (e.g., mSON management device 130 and cSON management device 140). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 1-4, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms) as used herein to describe: a relationship of a value to a threshold, may be used interchangeably with the term "less than or equal to" (or similar terms). As used herein, "exceeding" a threshold (or similar terms) may be used interchangeably with "b greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the processor-executable instructions causes the one or more processors to:
   determine that a service request, originating from a User Equipment ("UE") operating in a particular Radio Access Network ("RAN") of a wireless network, is associated with a set of requirements;
   provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN;
   provision, by a second management device, operating in a core cloud of the wireless network, a second set of resources from a second plurality of configurable resources of the core cloud in response to at least a second subset of the set of requirements being associated with providing centralized access to services of the wireless network from the core cloud;
   provide service access to the UE via the first set of resources and the second set of resources; and
   provide a first set of control plane or user plane functionalities with latency below a threshold from virtualized Distributed Units ("DUs") within the edge cloud, the virtualized DUs executing on the first set of resources based on the provisioning by the first management device.

2. The device of claim 1, wherein executing the processor-executable instructions further causes the one or more processors to:
   provide a different second set of control plane or user plane functionalities with latency above the threshold from virtualized Central Units ("CUs") within the core cloud, the CUs executing on the second set of resources based on the provisioning by the second management device.

3. A device, comprising:
a non-transitory computer-readable medium storing a set of processor-executable instructions; and
one or more processors configured to execute the set of processor-executable instructions, wherein executing the processor-executable instructions causes the one or more processors to:
   determine that a service request, originating from a User Equipment ("UE") operating in a particular Radio Access Network ("RAN") of a wireless network, is associated with a set of requirements;
   compare the set of requirements against one or more latency thresholds for Ultra Reliable Low Latency Communication ("URLLC");
   provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN,
      wherein provisioning the first set of resources comprises providing the service request or the set of requirements associated with the service request to the first management device in response to the set of requirements comprising a latency requirement that is less than the latency threshold for URLLC;
   provision, by a second management device, operating in a core cloud of the wireless network, a second set of resources from a second plurality of configurable resources of the core cloud in response to at least a second subset of the set of requirements being associated with providing centralized access to services of the wireless network from the core cloud,
      wherein provisioning the second set of resources comprises providing the service request or the set of requirements associated with the service request to the second management device in response to the set of requirements comprising a latency requirement that is more than the latency threshold for URLLC; and
   provide service access to the UE via the first set of resources and the second set of resources.

4. The device of claim 3, wherein executing the processor-executable instructions, to provision the first set of resources, further causes the one or more processors to provision the first set of resources to implement at least one layer from the set of layers that includes: a Radio Resource Control ("RRC") layer, a Packet Data Convergence Protocol ("PDCP") layer, a Radio Link Control ("RLC") layer, a Medium Access Control ("MAC") layer, a Physical ("PHY") layer, and a Radio Frequency ("RF") layer; and
   wherein executing the processor-executable instructions, to provision the second set of resources, further causes the one or more processors to provision the second set of resources to implement the layers, of the set of layers, that are not implemented by the first set of resources.

5. A device, comprising:
a non-transitory computer-readable medium storing a set of processor-executable instructions; and
one or more processors configured to execute the set of processor-executable instructions, wherein executing the processor-executable instructions causes the one or more processors to:
   determine that a service request, originating from a User Equipment ("UE") operating in a particular Radio Access Network ("RAN") of a wireless network, is associated with a set of requirements;
   provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN;
   provision, by a second management device, operating in a core cloud of the wireless network, a second set of resources from a second plurality of configurable resources of the core cloud in response to at least a second subset of the set of requirements being associated with providing centralized access to services of the wireless network from the core cloud;

provide service access to the UE via the first set of resources and the second set of resources;

provide a content cache in the edge cloud based on the first management device provisioning a third set of resources from the first plurality of configurable resources in response to the set of requirements being associated with providing localized storage in the edge cloud; and provide a content cache in the core cloud based on the second management device provisioning a fourth set of resources from the second plurality of configurable resources in response to the set of requirements being associated with providing centralized storage in the core cloud.

6. The device of claim 5, wherein executing the processor-executable instructions further causes the one or more processors to:

configure one or more of Hybrid Automatic Repeat reQuest ("HARQ"), number of repetitions, Transmit Time Interval ("TTI") bundling, handover thresholds, data and control channel power, error rate, modulation and coding rate, voice and video codec rate, Physical Hybrid-ARQ Indicator Channel ("PHICH") timing, or uplink/downlink frequency scheduling parameters of the first set of resources based on the first subset of requirements.

7. A device, comprising:

a non-transitory computer-readable medium storing a set of processor-executable instructions; and one or more processors configured to execute the set of processor-executable instructions, wherein executing the processor-executable instructions causes the one or more processors to:

determine that a service request, originating from a User Equipment ("UE") operating in a particular Radio Access Network ("RAN") of a wireless network, is associated with a set of requirements;

provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN;

provision, by a second management device, operating in a core cloud of the wireless network, a second set of resources from a second plurality of configurable resources of the core cloud in response to at least a second subset of the set of requirements being associated with providing centralized access to services of the wireless network from the core cloud;

provide service access to the UE via the first set of resources and the second set of resources;

map a first service level agreement ("SLA") to the first set of resources, the first SLA being associated with a first level of service provided by the first set of resources;

map a second SLA to the second set of resources, the second SLA being associated with a different second level of service provided by the second set of resources;

compare the set of requirements associated with the request to the second level of service associated with the second SLA;

configure the service access via the second set of resources in response to the second level of service meeting or exceeding the set of requirements associated with the request; and configure the service access via the first set of resources in response to the second level of service not meeting or exceeding the set of requirements associated with the request, and the first level of service associated with the first SLA meeting or exceeding the set of requirements associated with the request.

8. A device, comprising:

a non-transitory computer-readable medium storing a set of processor-executable instructions; and one or more processors configured to execute the set of processor-executable instructions, wherein executing the processor-executable instructions causes the one or more processors to:

determine that a service request, originating from a User Equipment ("UE") operating in a particular Radio Access Network ("RAN") of a wireless network, is associated with a set of requirements;

provision, by a first management device, operating in an edge cloud of the wireless network, a first plurality of configurable resources of the edge cloud to a first set of network slices, each network slice of the first set of network slices comprising a different set of resources that provide a different level of service;

provision, by a first management device, a first set of resources from the first plurality of configurable resources of the edge cloud in response to at least a first subset of the set of requirements being associated with providing localized access to services of the wireless network from the edge cloud, wherein the edge cloud is located within a threshold geographic proximity of the particular RAN, wherein provisioning the first set of resources comprises selecting, by the first management device, a first network slice from the first set of network slices for providing the service access to the UE, the first network slice comprising the first set of resources, and providing a level of service that meets or exceeds the first subset of the set of requirements;

provision, by a second management device, operating in a core cloud of the wireless network, a second set of resources from a second plurality of configurable resources of the core cloud in response to at least a second subset of the set of requirements being associated with providing centralized access to services of the wireless network from the core cloud;

provide service access to the UE via the first set of resources and the second set of resources.

9. The device of claim 8, wherein executing the processor-executable instructions further causes the one or more processors to:

provision, by the second management device, the second plurality of configurable resources to a different second set of network slices, each network slice of the second set of network slices comprising a different set of resources that provide a different level of service, and wherein provisioning the second set of resources comprises selecting, by the second management device, a second network slice from the first set of network slices for providing the service access to the UE, the second network slice comprises the second set of resources, and provides a level of service that meets or exceeds the second subset of the set of requirements.

10. A device, comprising:
a non-transitory computer-readable medium storing a set of processor-executable instructions; and
one or more processors configured to execute the set of processor-executable instructions, wherein executing the processor-executable instructions causes the one or more processors to:
determine that a service request, originating from a User Equipment ("UE") operating in a particular Radio Access Network ("RAN") of a wireless network, is associated with a set of requirements;
provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN;
provision, by a second management device, operating in a core cloud of the wireless network, a second set of resources from a second plurality of configurable resources of the core cloud in response to at least a second subset of the set of requirements being associated with providing centralized access to services of the wireless network from the core cloud;
provide service access to the UE via the first set of resources and the second set of resources;
provide a first set of mobility management, session management, access management, or radio resource management functionalities from the first set of sources; and
provide a different second set of mobility management, session management, access management, or radio resource management functionalities from the second set of sources.

11. The device of claim 10, wherein executing the processor-executable instructions further causes the one or more processors to:
configure one or more of Hybrid Automatic Repeat reQuest ("HARQ"), number of repetitions, Transmit Time Interval ("TTI") bundling, handover thresholds, data and control channel power, error rate, modulation and coding rate, voice and video codec rate, Physical Hybrid-ARQ Indicator Channel ("PHICH") timing, or uplink/downlink frequency scheduling parameters of the first set of resources based on the first subset of requirements.

12. A The non-transitory computer-readable medium, storing a set of processor-executable instructions, which, when executed by one or more processors, cause the one or more processors to:
determine that a service request, originating from a User Equipment ("UE") operating in a particular Radio Access Network ("RAN") of a wireless network, is associated with a set of requirements;
provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN;
provision, by a second management device, operating in a core cloud of the wireless network, a second set of resources from a second plurality of configurable resources of the core cloud in response to at least a second subset of the set of requirements being associated with providing centralized access to services of the wireless network from the core cloud;
provide service access to the UE via the first set of resources and the second set of resources; and
provide a first set of control plane or user plane functionalities with latency below a threshold from virtualized Distributed Units ("DUs") within the edge cloud, the virtualized DUs executing on the first set of resources based on the provisioning by the first management device.

13. The non-transitory computer-readable medium of claim 12, wherein the processor-executable instructions further include processor-executable instructions to:
provide a different second set of control plane or user plane functionalities with latency above the threshold from virtualized Central Units ("CUs") within the core cloud, the CUs executing on the second set of resources based on the provisioning by the second management device.

14. A non-transitory computer-readable medium, storing a set of processor-executable instructions, which, when executed by one or more processors, cause the one or more processors to:
determine that a service request, originating from a User Equipment ("UE") operating in a particular Radio Access Network ("RAN") of a wireless network, is associated with a set of requirements;
compare the set of requirements against one or more latency thresholds for Ultra Reliable Low Latency Communication ("URLLC");
provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN,
wherein provisioning the first set of resources comprises providing the service request or the set of requirements associated with the service request to the first management device in response to the set of requirements comprising a latency requirement that is less than the latency threshold for URLLC;
provision, by a second management device, operating in a core cloud of the wireless network, a second set of resources from a second plurality of configurable resources of the core cloud in response to at least a second subset of the set of requirements being associated with providing centralized access to services of the wireless network from the core cloud,
wherein provisioning the second set of resources comprises providing the service request or the set of requirements associated with the service request to the second management device in response to the set of requirements comprising a latency requirement that is more than the latency threshold for URLLC; and provide service access to the UE via the first set of resources and the second set of resources.

15. The non-transitory computer-readable medium of claim 14, wherein the processor-executable instructions, to provision the first set of resources include provisioning the first set of resources to implement at least one layer from the set of layers that includes: a Radio Resource Control ("RRC") layer, a Packet Data Convergence Protocol ("PDCP") layer, a Radio Link Control ("RLC") layer, a Medium Access Control ("MAC") layer, a Physical ("PHY") layer, and a Radio Frequency ("RF") layer; and
wherein the processor-executable instructions, to provision the second set of resources include provisioning the second set of resources to implement the layers, of the set of layers, that are not implemented by the first set of resources.

16. The non-transitory computer-readable medium of claim 14, the processor-executable instructions further include processor-executable instructions to:
configure one or more of Hybrid Automatic Repeat reQuest ("HARQ"), number of repetitions, Transmit Time Interval ("TTI") bundling, handover thresholds, data and control channel power, error rate, modulation and coding rate, voice and video codec rate, Physical Hybrid-ARQ Indicator Channel ("PHICH") timing, or uplink/downlink frequency scheduling parameters of the first set of resources based on the first subset of requirements.

17. A non-transitory computer-readable medium, storing a set of processor-executable instructions, which, when executed by one or more processors, cause the one or more processors to:
determine that a service request, originating from a User Equipment ("UE") operating in a particular Radio Access Network ("RAN") of a wireless network, is associated with a set of requirements;
provision, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN;
provision, by a second management device, operating in a core cloud of the wireless network, a second set of resources from a second plurality of configurable resources of the core cloud in response to at least a second subset of the set of requirements being associated with providing centralized access to services of the wireless network from the core cloud;
provide service access to the UE via the first set of resources and the second set of resources;
provide a content cache in the edge cloud based on the first management device provisioning a third set of resources from the first plurality of configurable resources in response to the set of requirements being associated with providing localized storage in the edge cloud; and
provide a content cache in the core cloud based on the second management device provisioning a fourth set of resources from the second plurality of configurable resources in response to the set of requirements being associated with providing centralized storage in the core cloud.

18. A method, further comprising:
determining that a service request, originating from a User Equipment ("UE") operating in a particular Radio Access Network ("RAN") of a wireless network, is associated with a set of requirements;
provisioning, by a first management device, operating in an edge cloud of the wireless network, a first set of resources from a first plurality of configurable resources of the edge cloud in response to at least a first subset of the set of requirements being associated with providing localized access to services of the wireless network from the edge cloud, wherein the edge cloud is located within a threshold geographic proximity of the particular RAN;
provisioning, by a second management device, operating in a core cloud of the wireless network, a second set of resources from a second plurality of configurable resources of the core cloud in response to at least a second subset of the set of requirements being associated with providing centralized access to services of the wireless network from the core cloud, wherein the core cloud is not located with geographic proximity to the particular RAN;
providing service access to the UE via the first set of resources and the second set of resources; and
providing a first set of control plane or user plane functionalities with latency below a threshold from virtualized Distributed Units ("DUs") within the edge cloud, the virtualized DUs executing on the first set of resources based on the provisioning by the first management device.

19. The method of claim 18, further comprising:
providing a different second set of control plane or user plane functionalities with latency above the threshold from virtualized Central Units ("CUs") within the core cloud, the CUs executing on the second set of resources based on the provisioning by the second management device.

20. The method of claim 18, further comprising:
configuring one or more of Hybrid Automatic Repeat reQuest ("HARQ"), number of repetitions, Transmit Time Interval ("TTI") bundling, handover thresholds, data and control channel power, error rate, modulation and coding rate, voice and video codec rate, Physical Hybrid-ARQ Indicator Channel ("PHICH") timing, or uplink/downlink frequency scheduling parameters of the first set of resources based on the first subset of requirements.

* * * * *